3,394,979
REARVIEW MIRROR FOR MOUNTING ON THE
VENT WINDOW OF AN AUTOMOBILE
Robert L. Wilson, 10047 Avenue N,
Chicago, Ill. 60617
Filed Mar. 17, 1964, Ser. No. 352,490
2 Claims. (Cl. 350—307)

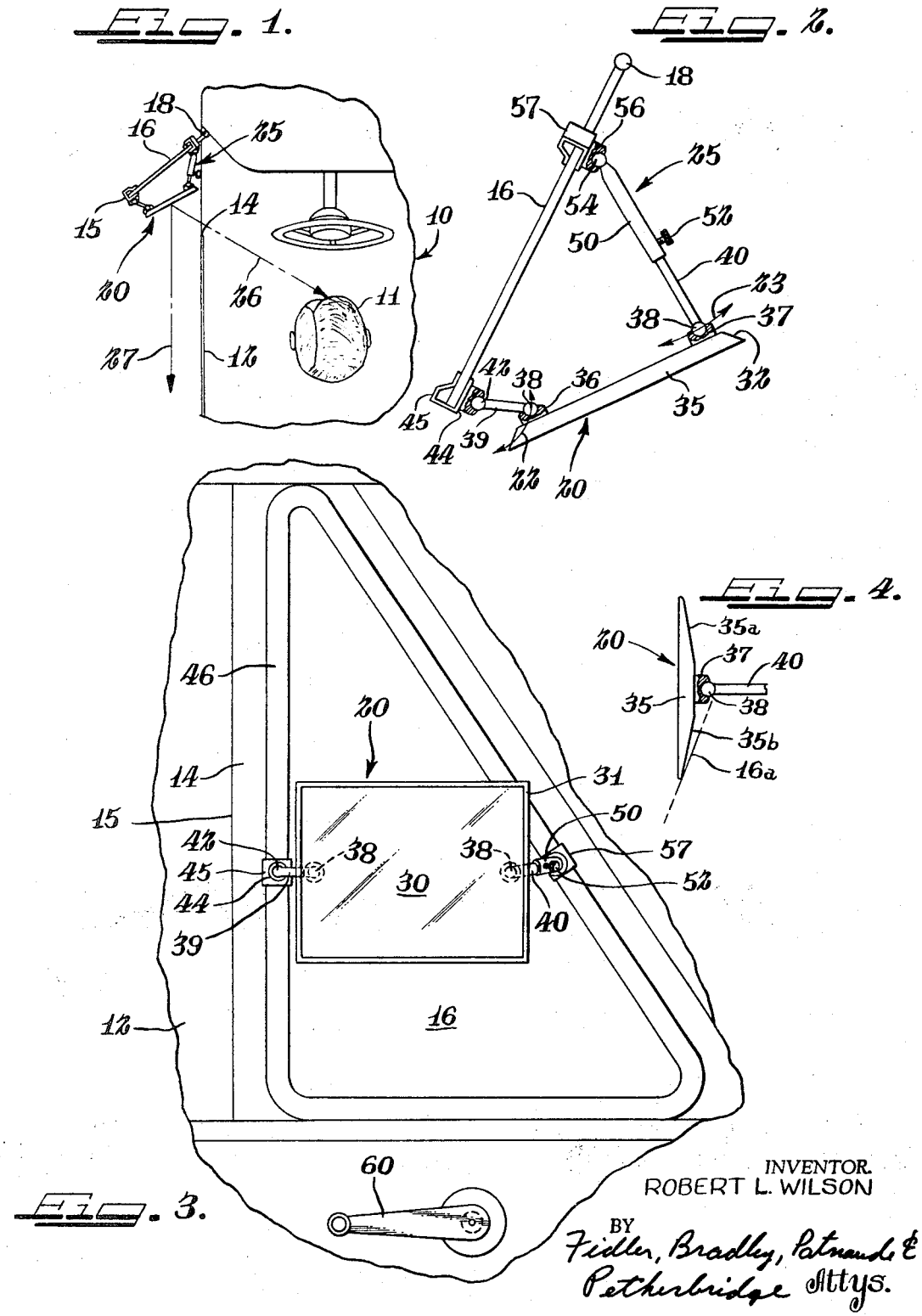

ABSTRACT OF THE DISCLOSURE

A portable rearview mirror unit removably connectable to a pivotally adjustable side ventilator of a vehicle. The frame of the rearview mirror is provided with legs which are mounted thereon and universally movable with respect thereto. One of the legs is equipped with a telescoping portion to provide for axial adjustment of the longitudinal dimension thereof. The ends of each of the legs is provided with a universally adjustable manually operable clamp to permit the removable securement of the assembly to an adjustable ventilator.

---

The present invention relates to an improvement in rearview mirrors, and more particularly to a new rearview mirror adapted for mounting on a side ventilator of a motor vehicle, or the like.

The new mirror, to be described in detail below, is made of a suitable piece of mirror glass secured in a frame, which frame in turn is carried on adjustable pivots mounted on legs in turn adjustably connected to the ventilator. One of the legs is further adjustable to provide an additional degree of adjustment whereby a substantially enlarged range of adjustments is provided for such mirrors.

In certain parts of the world where freezing rain, sleet and snow, and the like, prevail at certain times or seasons of the year, the rear windows of a vehicle can be covered with ice or snow and thus the interiorly mounted rear view mirror is rendered useless. In this kind of weather, the exteriorly mounted rearview mirrors can become iced over and rendered useless. In addition to this, the side windows of a vehicle can themselves become ice coated so that it is necessary to open them wide in order to use a rearview mirror if same is not ice coated on its mirror surface.

Because certain vehicles are required to be in operation even under such unfavorable driving conditions, for example, police vehicles, military vehicles, fire equipment, ambulances, doctors' vehicles, public conveyances, and the like, it is preferred that rear vision facilities be available under all weather conditions. In addition to this, any vehicle may be at a remote location in making a trip and encounter such conditions and be required to continue even though atmospheric conditions are extremely unfavorable.

The present invention affords a rearview mirror which is protected from the elements when the vehicle is idle and is shielded from the elements by the ventilator when same is in use under unfavorable atmospheric conditions. The device swings in and out to greater or lesser desired angles along with the ventilator. For maximum rear vision the ventilator can be swung out at a large angle, and for a suitable minimum vision, the angle can be substantially reduced, but in this latter angle the angular relationship of the ventilator and the mirror must be greater to attain the desired rear vision function. The ventilator shields the mirror, and further serves to aspirate warmed inside air over the mirror to prevent formation of ice and fog thereon.

Accordingly, it is a broad object of the invention to provide an improved all-weather rearview mirror.

A more detailed object of the invention is to provide a rearview mirror for attachment to an angular movable ventilator, or the like, of a vehicle.

A still more specific object of the invention is to provide a rearview mirror adapted to be mounted on a vehicle's adjustable side ventilator and having many further degrees of adjustment than afforded by presently known rearview mirrors, whereby same may adapt readily to vehicles of different ventilator construction, location, and the like.

The foregoing and other features, objects and advantages of the invention will be either obvious or pointed out in the following specification and claims as read in view of the accompanying drawing in which:

FIG. 1 is a diagrammatic plan view of a new rearview mirror mounted on the inside of a vehicle's ventilator;

FIG. 2 is an enlarged diagrammatic view of the ventilator and mirror arranged in different relative angles for accommodating for different distances of opening of the ventilator;

FIG. 3 is a further enlarged detailed elevational view of the inside of the ventilator with the rearview mirror mounted thereon; and FIG. 4 is a side view of the mirror only looking to the left at FIG. 2.

Referring now in detail to the drawing and first to FIG. 1, an operator's location is shown with the top of an operator's head 11 being shown directed forwardly. A window 12 on the left side of the operator's location 10 may have a suitably adapted edge 14 such as a rubber gasket, not shown, cooperable with an edge 15 of a ventilator 16 for sealing the rear edge 15 of the ventilator when same is closed. The ventilator 16 is swung out around a suitable pivot 18 to the position shown and in this position a rear view mirror 20 is adjustably mounted on connections to be explained in detail below.

Although different operators desire several different adjustments of the mirror, a feature of this mirror is not only that it can be adjusted to a suitable angle for a particular operator, but can be rotated in the direction of arrows 22 and 23 as well as in numerous directions at an angle to such arrows around universal joints to be described below. In addition, an extensible leg is indicated generally at 25 and this leg can be telescopically shortened and lengthened from the position shown to afford a maximum range of adjustment of this mirror. If the mirror is moved bodily clockwise relative to the ventilator 16 in the direction of the arrows 22 and 23, the mirror will be moved outwardly more with respect to the edge 14 of the window 12 from the position shown.

In FIG. 1, a line of vision 26 is directed between the operator's eyes and the reflection line 27 of same is directed toward the rear of the vehicle. At the angle shown in FIG. 1, the mirror 20 is substantially fully exposed for permitting viewing of a large rear area. If viewing of still more rear area is desired, the mirror 20 can be moved bodily outward in a clockwise direction around the pivots.

With the device shown in the position of FIG. 2, the mirror 20 is not providing a large rear vision area and the ventilator 16 is shown at a position of lesser degree of opening. To afford more rear vision area, however, the mirror 20 can be moved bodily clockwise around its pivotal connections to present more rear vision area than in the position shown in FIG. 2 while still providing a small amount of ventilation and aspiration of warm air past the mirror.

The specific details of construction (here presented by way of example only and not to be construed in a restricting sense) will now be described with reference particularly to FIGS. 2 and 3.

The rear view mirror 20 has a suitable reflecting surface 30. The back and/or the edges of the mirror are mounted in a frame 31 which is preferably angled toward the rear as indicated by the reference character 32, and the mirror may be cemented in place in the frame. The angled edges 32 provide for a maximum degree of adjustment when the mirror is positioned closer to the inside of the ventilator 16 than in either of positions shown in FIGS. 1 and 2. This close position of the mirror may be best utilized when the atmospheric conditions are severe and only the minimum of the opening of a ventilator is desired for the comfort or safety of occupants, such as when used in ambulances and the like. However, when such minimum ventilator opening position is being utilized, suitable rear vision is afforded by this mirror because it can be adjusted very closely with sufficient mirror area exposed for rear vision beyond the edge 15 of the ventilator 16. In such minimum opening position, it may be desirable that the operator of the vehicle keep his head 11 well forward in the operator's area 10 to widen the angles between the lines of sight 26 and 27 to approximately 90 degrees. When leaning forward, the operator will need to adjust the angle of the mirror, and facile adjustability is a useful attribute of the invention.

A back surface 35 of the frame 32 for the mirror 20 is provided with a suitable socket 36 at its left end and a similar socket 37 at its other end, each of which receive well known ball ends 38 carried by bars 39 and 40, respectively. It is preferred that the ball and socket joints provide an ample degree of adjustability in keeping with the ball and socket joint art to provide the greatest degree of adjustability for this rearview mirror. The opposite end of the bar 39 has a similar ball 42 cooperable with a socket 44 carried by a clip 45. The clip 45 is adapted to frictionally slip over either a frame 46 of the ventilator, or an edge of the glass in those ventilators provided with glass edges. Friction alone may be sufficient for many adaptations of this invention. However, it is contemplated that where this mirror is to be used quite frequently or installed permanently, it may be more desirable to use a cement, or provide holes for riveted and/or screwed connections, or the like.

The leg 40 fits into a sleeve or tube 50 and can be secured as by a thumb screw 52 or by friction in a suitable manner. However, at present, a thumb screw of the knurled type is preferred and the same can be manipulated by the thumb and first finger while the mirror is being adjusted by the ball of the thumb and the second, third and fourth fingers. The tube 50 has a similar ball 54 secured at its end and connected with a socket 56 carried on a bracket 57 that is frictionally fit, or otherwise suitably secured, to another point on the edge of the ventilator 16. The clips 45 and 57 are identical although it is contemplated that different types of clips may be best suited for different edges of a single ventilator and different modifications of such clips may be required for different models and makes of vehicles.

The ventilators 16 may be of the kind that are moved out directed by the fingers of an operator or occupant of a vehicle, and/or may be of the kind operated by a crank 60, FIG. 3, in well-known manner. As is common in the present exteriorly mounted rearview mirrors, it may be desirable to have one or more mirrors on each side of the vehicle. It is to be noted, with reference to FIG. 3, that the mirror without modification can be rotated 180 degrees to provide opposite hand ventilator mounting and this comprises a further attribute of this invention.

Referring to FIG. 4, the frame 35 is shown tapered at surfaces 35a and 35b to afford a maximum adjustment around a horizontal axis about the pivots 38, only one being seen in this view. Such adjustment affords a wide variation of mounting positions for the device, and accommodates different sized operators having different eye levels with respect to the mirror 20.

Because of the amount of extension that can be attained by the telescoping structure 25, the rearview mirror 20 can be mounted relatively upwardly and downwardly with respect to the ventilator 16 and can accommodate several different shapes as the triangular ventilator 16 illustrated and described.

While I have shown and described in detail one presently preferred embodiment of my invention, obviously modifications and minor structural changes will occur to others working in the art. Accordingly, the scope of the following claims is to be restricted only by and in accordance with the contribution to the art rendered by this invention.

I claim:
1. A portable rearview mirror for mounting on a pivotally adjustable side ventilator of a vehicle comprising a mirror frame, a mirror mounted on and secured to said frame, a first leg secured to the mirror frame and universally adjustable with respect thereto, the first leg being provided with a first portion and a telescoping second portion which is axially movable with respect to the first portion and which can be positioned in an infinite number of positions with respect to the first leg and secured thereto in a preselected position by frictional means, manually operable clamp means connected to an end of the first leg and universally adjustable with respect thereto, a second leg secured to the mirror frame by universal pivot means, the second leg having manually operable clamp means secured to an end thereof by a universal pivot means whereby the rearview mirror can be removably secured to an adjustable side ventilator and can be infinitely adjusted with respect thereto.

2. The portable rearview mirror of claim 1 wherein the frictional means includes manually adjustable means for permitting the manual selective adjustment of the first and second portions of the first leg.

References Cited

UNITED STATES PATENTS

| | | | |
|---|---|---|---|
| 2,097,419 | 10/1937 | Schmidt | 350—288 |
| 2,251,325 | 8/1941 | Clark | 350—307 |
| 2,458,117 | 1/1949 | Tolbert | 248—279 |
| 2,856,816 | 10/1958 | Ross | 248—281 |
| 3,142,469 | 7/1964 | Clemmer | 350—307 |

FOREIGN PATENTS 1,248,493 11/1960 France.

OTHER REFERENCES

"Hints From the Model Garage," Popular Science, vol. 179, No. 5, November 1961, p. 189.

JEWELL H. PEDERSEN, *Primary Examiner.*

O. B. CHEW, *Assistant Examiner.*